Dec. 12, 1944.　　　L. H. GARLINGHOUSE　　　2,364,628
SECURING MEMBER FOR ROPES AND CABLES
Filed March 27, 1943　　　2 Sheets-Sheet 1
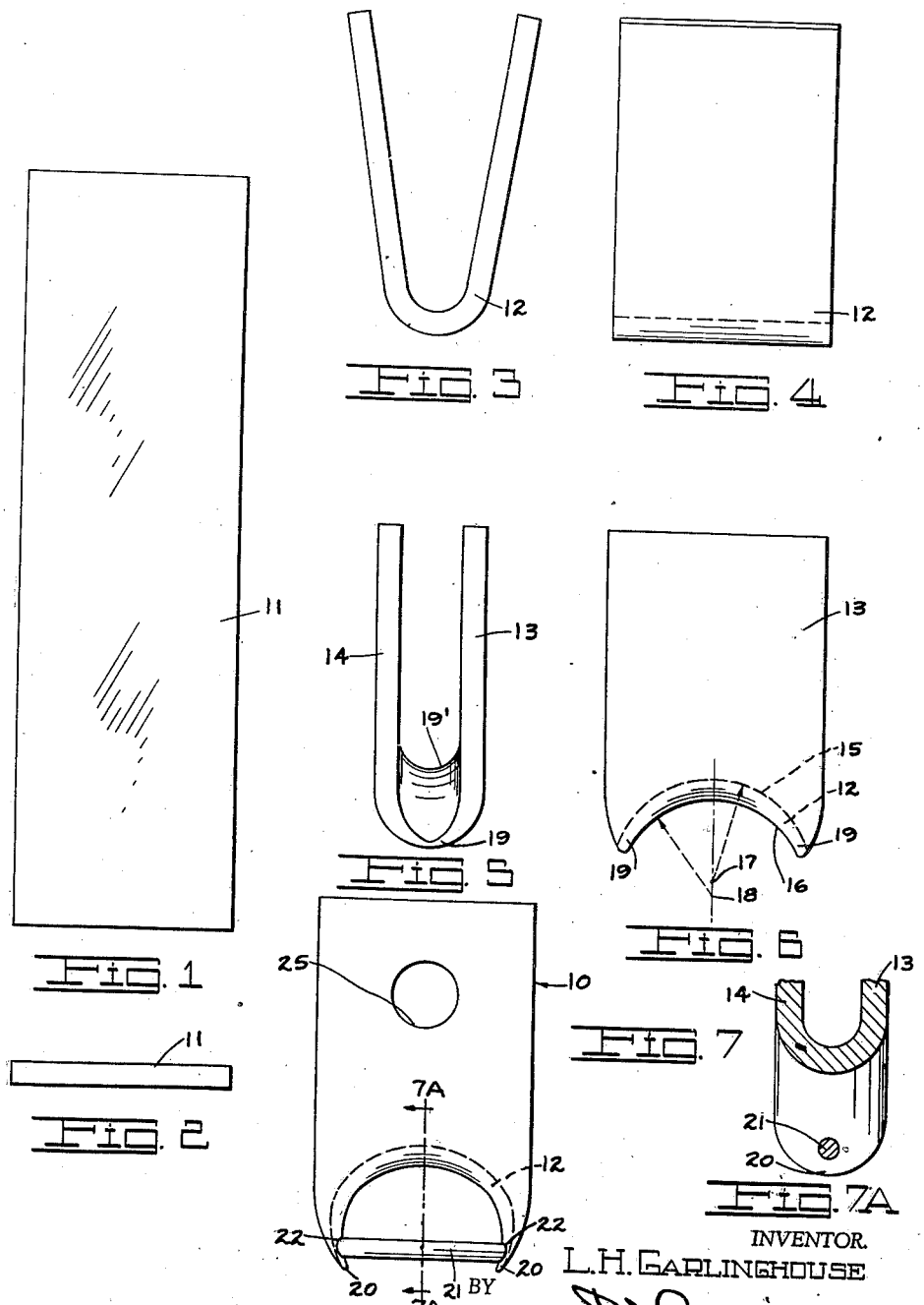
INVENTOR.
L. H. GARLINGHOUSE
BY
ATTORNEY Dec. 12, 1944. L. H. GARLINGHOUSE 2,364,628
SECURING MEMBER FOR ROPES AND CABLES
Filed March 27, 1943 2 Sheets-Sheet 2
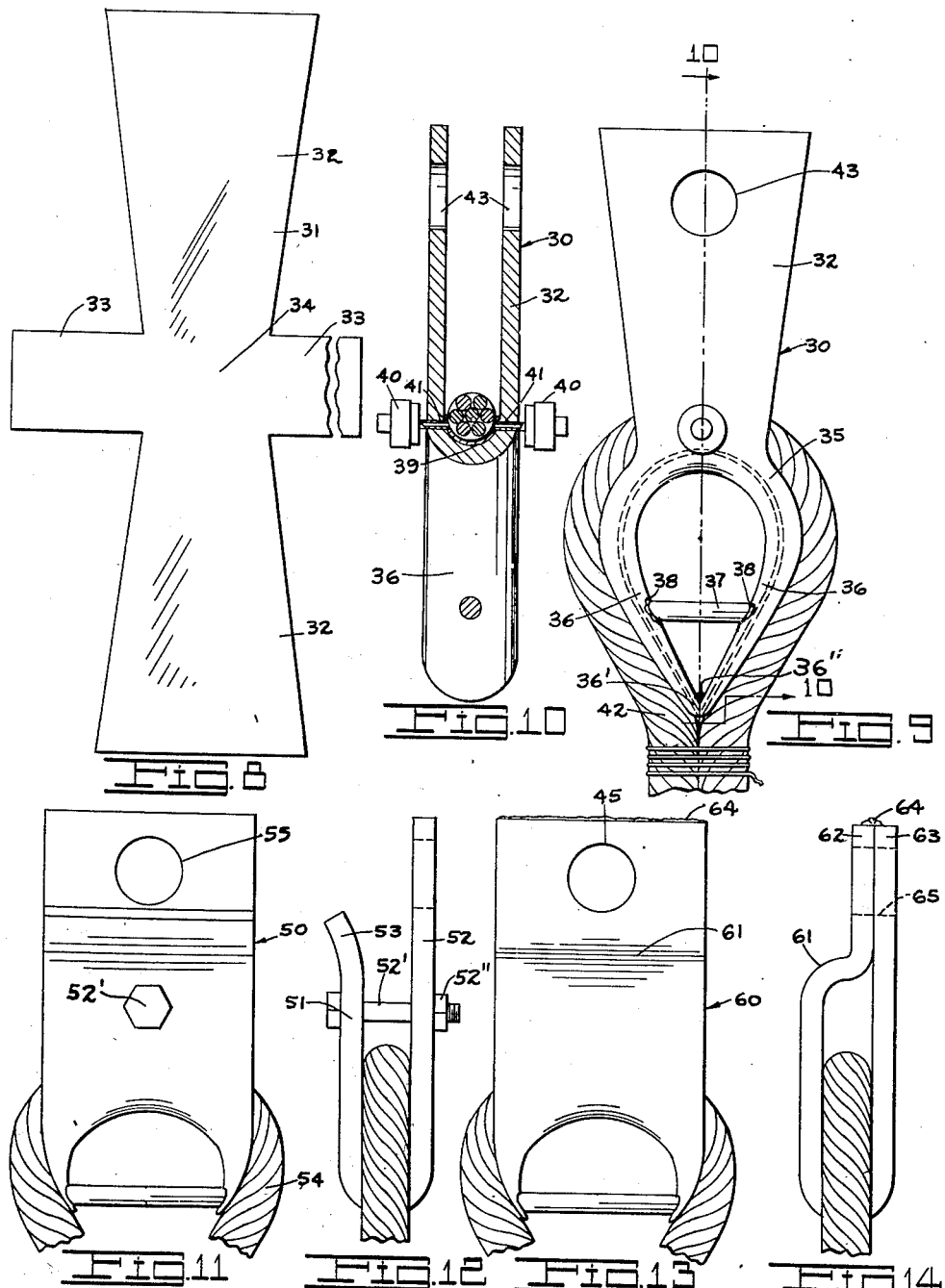
INVENTOR.
L. H. GARLINGHOUSE
BY
ATTORNEY Patented Dec. 12, 1944

2,364,628

UNITED STATES PATENT OFFICE 2,364,628

SECURING MEMBER FOR ROPE AND CABLE

Leslie H. Garlinghouse, Los Angeles, Calif.

Application March 27, 1943, Serial No. 480,820

12 Claims. (Cl. 24—115)

This invention relates to securing members for ropes and cables.

The general object of the invention is to provide a novel means whereby a rope or cable may be held securely in place upon a support.

A further object of the invention is to provide a novel combined thimble and shackle by means of which cables may be quickly arranged in position and securely held.

Another object of the invention is to provide a cable support including a holding portion and a cable engaging portion wherein the engaging portion is of novel construction.

A further object of the invention is to provide a cable securing member including a thimble portion having novel means for bracing the same.

Another object of the invention is to provide a cable securing member including novel means for lubricating the cable.

Other objects and advantages of my invention will be apparent from the following description taken in connection with the accompanying drawings wherein:

Fig. 1 is a plan view of the blank from which my securing member is made;

Fig. 2 is an end view of the blank;

Fig. 3 is an end view showing the first steps in forming the securing member;

Fig. 4 is a side view showing the member after the first step;

Figs. 5 and 6 are end and side views respectively showing the second step in forming the securing member;

Fig. 7 shows the completed securing member;

Fig. 7A is a section taken on line 7A—7A, Fig. 7;

Fig. 8 is a plan view of a modified blank;

Fig. 9 is a front elevation showing a securing member made from the modified blank;

Fig. 10 is a section taken on line 10—10, Fig. 9;

Fig. 11 is a front view showing a further modification;

Fig. 12 is an end view showing the further modified securing member, and

Figs. 13 and 14 are front and end views respectively showing a further modification.

Referring to the drawings by reference characters I have indicated by improved securing member generally at 10. This securing member is preferably made from a blank 11 such as a rectangular metal bar. In the process of manufacture the bar is preferably first bent into a loop as at 12 so that it assumes the shape shown in Figs. 3 and 4.

The loop portion 12 is then bent so that the upper surface 15 and the lower surface 16 are curved as shown in Figs. 5 and 6 and the sides 13 and 14 are brought into parallel relation. In working the portion 12 I preferably operate upon it with a die which has such a configuration that the curves forming the surfaces 15 and 16 are struck substantially from centers 17 and 18 respectively, the radii being of such length and the centers so disposed that the portion 12 is thinned out as at 19 at each side. At the same time the upper surface of the part 12 is rounded as at 19' to receive a rope or cable.

After the stock has been worked into the shape shown in Figs. 5 and 6 the looped portion 12 is further worked to thin out the parts 19 and provide tips 20.

By use of proper dies and equipment all of the steps above mentioned may be made with one heat of the metal so that economy of manufacture is secured. After the member is formed into the shape shown in Fig. 7 the tips 20 are connected by a cylindrical bar member 21 which is welded as at 22 to the tips 20.

The upper surface of the portion 12 forms a support for a rope or cable and good manufacturing practice indicates that the area of contact between the cable and support should be approximately 120°, a length of arc which is secured by means of my securing member. After the member is completed opposed holes 25 are drilled through the sides 13 and 14 to hold the member in place.

In the rigging art it has been customary to provide a thimble about which a rope is secured and this thimble has thereafter been inserted in a shackle and the shackle properly supported for the desired function. My improved securing member does away with one of the members previously employed and in effect is a combined shackle and thimble, the looped portion serving as a thimble while the upper portion, here shown as integral with the looped portion, serves as a shackle. Thus my device in combining in one member the two parts heretofore employed does not sacrifice any advantages of the old construction.

In Figs. 8, 9 and 10 I show a modification of my invention wherein the securing member indicated generally at 30 is made from a blank indicated at 31 in Fig. 8. This blank includes end portions 32 and wing portions 33.

The blank is bent in the manner previously described with the same successive steps to form the securing member shown in Figs. 9 and 10. The portions 32 form the sides of the securing member and the portion 34 between the wings 33, together with the wings, form the cable engaging loop 35. The wings 33 have their tips 36 bent downwardly to form a point 36', where they are welded together as at 36''. A rod 37 extends between said tips and is welded in place as shown at 38.

The curved cable engaging face of the member is shown as covered with a sheath of oil bearing metal 39, which may be suitably secured in place as by welding. At each side the member 30 is provided with a grease cup 40 having a discharge tube 41 extending through the wall of the portion 32. The lubricating metal 39 and grease cups 40 when employed serve to lubricate the cable engaging face of the support member and thus reduce wear and friction.

In use a cable 42 is secured about the portion 35, as shown, and the member is supported by fastening members (not shown) which pass through aligned apertures 43 in the portion 32.

In Figs. 11 and 12 I show a further modification wherein the securing member is indicated generally at 50. This member is similar in all respects to the member shown in Fig. 7 except that one side 51 is shorter than the other side 52 and is bent outwardly as at 53 so that a hook is provided over which a cable 54 may be passed while seating it in position. The cable 54 is prevented from slipping out of the hook by a bolt 52' and a nut 52''. A suitable hole 55 serves to receive an attaching member.

In Figs. 13 and 14 the device is the same as that shown in Fig. 5 except that the side portion 60 is reversely bent as at 61 to provide a portion 62 which engages the side portion 63 and is welded thereto as at 64. Aligned apertures 65 provide for reception of suitable securing means (not shown).

From the foregoing description it will be apparent that I have invented a novel securing member which can be readily manufactured from a minimum amount of material and can be readily installed.

Having thus described my invention, I claim:

1. A cable securing member comprising a body having spaced sides, joined at one end by a rope engaging portion which is integral with the sides, said rope engaging portion having its ends extending downwardly in a curved manner, and a transverse member connecting the ends of the rope engaging portion and spaced from the intermediate part of the rope engaging portion.

2. A cable securing member comprising a body having spaced sides, said spaced sides being joined at the bottom by a rope engaging portion which is integral with the sides, said rope engaging portion being transversely concave on its upper face and being arcuate longitudinally, the ends of said rope engaging portion extending below the intermediate part of the rope engaging portion.

3. A cable securing member comprising a body having spaced sides, said spaced sides being joined at the bottom by an integral rope engaging portion, said rope engaging portion being transversely concave on its upper face, said rope engaging portion being arcuate longitudinally and having the ends thereof extending downwardly beyond the sides.

4. A cable securing member comprising a body having spaced sides, said spaced sides being joined at the bottom by an integral rope engaging portion, said rope engaging portion being transversely concave on its upper face and convex on its lower face, said rope engaging portion being arcuate longitudinally and having the ends thereof tapering downwardly in thickness and extending prong-like downwardly beyond the sides and towards each other.

5. A cable securing member comprising a body having spaced sides with parallel edges joined at the bottom by an integral rope engaging portion, said rope engaging portion being transversely concave on its upper face, said rope engaging portion being arcuate longitudinally and having the ends thereof extending pronglike downwardly beyond the sides and towards each other, and a transverse bar member disposed between the ends and connected to the ends.

6. A cable securing member comprising an integral body having planar spaced sides, said planar spaced sides being joined at the bottom by a rope engaging portion, said rope engaging portion being transversely concave on its upper face and having the ends thereof extending downwardly, and a liner of grease bearing material on the rope engaging portion.

7. A cable securing member comprising an integral body having planar spaced sides, said planar spaced sides being joined at the bottom by a rope engaging portion, said rope engaging portion being transversely concave on its upper face and having the ends thereof extending downwardly, and a grease cup in said member and communicating with said rope engaging portion.

8. A cable securing member comprising an integral body having planar spaced sides, the edges of said sides converging downwardly and being joined at the bottom by a rope engaging portion, said rope engaging portion being transversely concave on its upper face and being convex longitudinally on its upper face, a wing extending from each end of the bottom, the wings being transversely concave on their outer face.

9. A cable securing member comprising an integral body having planar spaced sides, the edges of said sides converging downwardly and being joined at the bottom by a rope engaging portion, said rope engaging portion being transversely concave on its upper face and being convex longitudinally on its upper face, a wing extending from each end of the bottom, the wings being transversely concave on their upper face and being longitudinally convex on their outer face, the free ends of said wings converging downwardly in prong-like portions.

10. A cable securing member comprising an integral body having planar spaced sides, the edges of said sides converging downwardly and being joined at the bottom by a rope engaging portion, said rope engaging portion being transversely concave on its upper face and being convex longitudinally on its upper face, a wing extending from each end of the bottom portion, the wings being transversely concave on their outer face and being longitudinally convex on their outer face, the free ends of said wings converging downwardly in prong-like portions, and a transverse bar connecting the prong-like portions, the thickness of the bottom wall of the wings decreasing downwardly.

11. A cable securing member comprising an integral body having planar spaced sides, the edges of said sides converging downwardly and being joined at the bottom by a rope engaging portion, said rope engaging portion being transversely concave on its upper face and being convex longitudinally on its upper face, a wing extending from each end of the bottom portion, the wings being transversely concave on their outer face and being longitudinally concave on their outer face, the free ends of said wings converging downwardly and meeting.

12. A cable securing member comprising an integral body having spaced sides, said spaced sides being joined at the bottom by a rope engaging portion, said rope engaging portion being transversely concave on its upper face and being arcuate longitudinally and having the ends thereof extending downwardly, one of said sides having its upper end bent to engage the other side and secured to the other side.

L. H. GARLINGHOUSE.